(12) United States Patent
Kalyanaraman

(10) Patent No.: US 11,053,358 B2
(45) Date of Patent: Jul. 6, 2021

(54) EMULSION METHOD FOR THE MANUFACTURE OF ULTRA-FINE SPHERICAL POLYMER PARTICLES

(71) Applicant: SABIC Global Technologies B.V., Bergen op Zoom (NL)

(72) Inventor: Viswanathan Kalyanaraman, Newburgh, IN (US)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 600 days.

(21) Appl. No.: 15/552,060

(22) PCT Filed: Feb. 19, 2016

(86) PCT No.: PCT/US2016/018615
§ 371 (c)(1),
(2) Date: Aug. 18, 2017

(87) PCT Pub. No.: WO2016/134224
PCT Pub. Date: Aug. 25, 2016

(65) Prior Publication Data
US 2018/0044484 A1    Feb. 15, 2018

Related U.S. Application Data

(60) Provisional application No. 62/118,782, filed on Feb. 20, 2015.

(51) Int. Cl.
*C08G 73/10* (2006.01)
*C08J 3/14* (2006.01)

(52) U.S. Cl.
CPC ............... *C08J 3/14* (2013.01); *C08G 73/10* (2013.01); *C08G 73/106* (2013.01);
(Continued)

(58) Field of Classification Search
CPC ......................................................... C08J 3/14
See application file for complete search history.

(56) References Cited

U.S. PATENT DOCUMENTS 5,804,682 A    9/1998    Fischer et al.
6,528,611 B2 *  3/2003   Vodermayer ............... C08J 3/14
                                                    528/176

(Continued)

FOREIGN PATENT DOCUMENTS

CN         1860159 A      11/2006
WO      2013175448 A1     11/2013

(Continued)

OTHER PUBLICATIONS

International Search Report for International Application No. PCT/US2016/018615; International Filing Date: Feb. 19, 2016; dated May 27, 2016; 5 pages.

(Continued)

*Primary Examiner* — Jacob T Minskey
(74) *Attorney, Agent, or Firm* — Cantor Colburn LLP

(57) ABSTRACT

A method for making spherical polymer particles, the method including: providing a polymer solution including a polymer in an amount of less than 10% by weight, based on the total weight of the polymer solution, and an organic solvent; combining the polymer solution, deionized water, and a first surfactant to provide an emulsification composition having an organic solvent fraction of 0.60 or higher by volume; forming an emulsion from the emulsification composition; and adding the emulsion into receiving water maintained at a temperature above the boiling point of the organic solvent for a period sufficient to evaporate the organic solvent, wherein the adding and the evaporating are at a rate effective to form an aqueous slurry comprising spherical polymer particles having a Dv100 (volume-based (Continued)

diameter) of 10 micrometers or less, as measured by laser diffraction.

15 Claims, 4 Drawing Sheets

(52) U.S. Cl.
CPC ....... *C08G 73/1053* (2013.01); *C08J 2369/00* (2013.01); *C08J 2379/08* (2013.01)

(56) References Cited

U.S. PATENT DOCUMENTS

| | | |
|---|---|---|
| 2005/0271888 A1 | 12/2005 | Moncla et al. |
| 2012/0263753 A1* | 10/2012 | O'Hagan ............... A61K 39/39 424/204.1 |
| 2013/0115293 A1* | 5/2013 | Sabnis ................. A61K 9/5146 424/486 |
| 2014/0272430 A1 | 9/2014 | Kalayaraman |
| 2014/0295363 A1 | 10/2014 | Sun et al. |

FOREIGN PATENT DOCUMENTS

| | | |
|---|---|---|
| WO | 2014072923 A1 | 5/2014 |
| WO | 2014151500 A1 | 9/2014 |
| WO | 2014164380 A1 | 10/2014 |

OTHER PUBLICATIONS

Written Opinion of the Internaitonal Searching Authority for International Application No. PCT/US2016/018615; International Filing Date: Feb. 19, 2016; dated May 27, 2016; 6 pages.

* cited by examiner

EMULSION METHOD FOR THE MANUFACTURE OF ULTRA-FINE SPHERICAL POLYMER PARTICLES

CROSS-REFERENCE TO RELATED APPLICATIONS

This application is a National Stage application of PCT/US2016/018615, filed Feb. 19, 2016, which claims the benefit of U.S. Provisional Application No. 62/118,782, filed Feb. 20, 2015, both of which are incorporated by reference herein in their entirety.

BACKGROUND

This disclosure relates generally to a process for making ultra-fine particles of a high performance polymer.

High performance polymers such as polyetherimides can be made into ultra-fine powders by emulsifying the polymer in an organic solvent, and further removing the organic solvent from the emulsion through distillation. Polyetherimides are available under the tradename ULTEM from SABIC. Information relevant to such methods can be found in U.S. Pat. No. 6,528,611. However, there remains a need for a method for producing ultrafine particles of consistently small diameter, for example less than 20 micrometers.

BRIEF SUMMARY

A method for making spherical polymer particles, the method including: providing a polymer solution including a polymer in an amount of less than 10% by weight, based on the total weight of the polymer solution, and an organic solvent; combining the polymer solution, deionized water, and a first surfactant to provide an emulsification composition having an organic fraction of 0.60 or higher by volume; forming an emulsion from the emulsification composition; and adding the emulsion into receiving water maintained at a temperature above the boiling point of the organic solvent for a period sufficient to evaporate the organic solvent, wherein the adding and the evaporating are at a rate effective to form an aqueous slurry comprising spherical polymer particles having a Dv100 (volume-based diameter) of 10 micrometers or less, as measured by laser diffraction.

A method for making spherical polymer particles, the method including: providing a polymer solution comprising a polymer in an amount of 10% by weight or higher, or 12% by weight or higher, or 15% by weight or higher, and an organic solvent; combining the polymer solution, deionized water, and a first surfactant, to form an emulsification composition having an organic fraction of 0.75 or higher by volume; forming an emulsion from the emulsification composition; and adding the emulsion into deionized receiving water maintained at a temperature above the boiling point of the organic solvent for a period sufficient to evaporate the organic solvent, wherein the adding and the evaporating are at a rate effective to form an aqueous slurry comprising spherical polymer particles having a Dv100 (volume-based diameter) of 10 micrometers or less, as measured by laser diffraction.

In another embodiment, spherical polymer particles are provided having a Dv100 (volume-based diameter) of 10 micrometers or less, preferably 5 micrometers or less, more preferably 3 micrometers or less, prepared by the above-described methods.

In yet another embodiment, an article is provided, the article prepared from the spherical polymer particles prepared by the above-described methods.

BRIEF DESCRIPTION OF THE DRAWINGS

These and other features, aspects, and advantages of the present invention will become better understood with reference to the following description and claims, and accompanying drawings.

Figure 1:
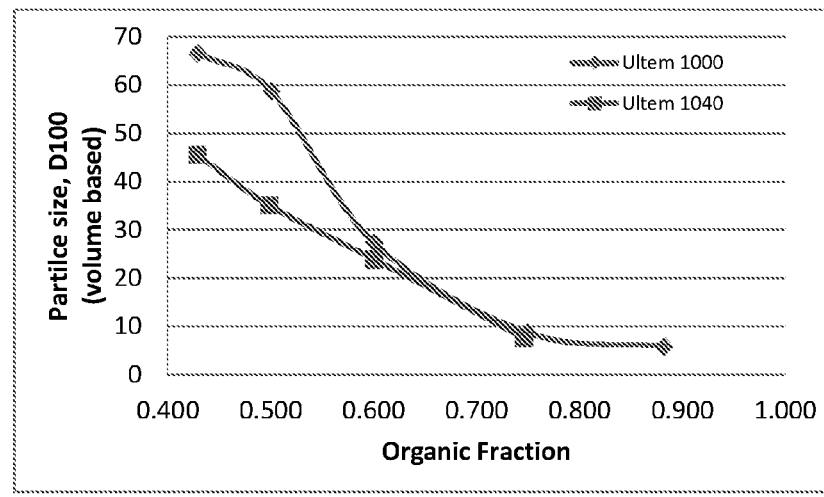
FIG. 1 is a graph showing the effect of organic fraction on the Dv100 (volume-based diameter), when the polyetherimide concentration in solvent was fixed (20% for ULTEM 1000; 25% for ULTEM 1040). In the case of ULTEM 1000, 15 grams of polymer, 60 grams of methylene chloride, 0.09 grams of sodium dodecyl benzene sulfonate and varying amount of water was used in the formulation. In the case of ULTEM 1040, 15 grams of polymer, 45 grams of methylene chloride, 0.12 grams of sodium dodecyl benzene sulfonate and varying amount of water was used in the formulation.

It should be understood that the various embodiments are not limited to the arrangements and instrumentality shown in the drawings.

DETAILED DESCRIPTION

This innovative process includes producing spherical polymer particles having a Dv100 (volume-based diameter) of 10 micrometers or less, by transferring a quantity of a polymer emulsion in a controlled fashion into deionized water. It was surprisingly discovered that spherical particles of the desired Dv100 (volume-based diameter) of 10 micrometers or less are produced when a polymer, dissolved in a solvent having a boiling point below 100° C. at a solids content of less than 10%, is combined with deionized water to provide a emulsification composition having an organic fraction of 0.60 or higher by volume; and the emulsion formed from the mixture is transferred into a quantity of deionized water that is maintained at a temperature sufficient to remove the organic solvent after transfer, forming an aqueous slurry. It was also found that when the polymer solids content of the dissolved polymer in the organic solvent was 10% or more, e.g., 20% or more, spherical particles of the desired Dv100 (volume-based diameter) of 10 micrometers or less were produced when the organic fraction was 0.75 of the emulsification composition was or higher. Thus, specific control of the concentration of the dissolved polymer, the organic fraction of the emulsification composition, and the method of transferring the emulsion allow production of ultra-fine, uniform polymer particles. According to various embodiments, the polymer can be a high performance polymer such as a polyetherimide; the solvent can be methylene chloride; and the surfactant can be sodium dodecyl benzene sulfonate.

In particular, an emulsion is formed from an emulsification composition having specific properties. The emulsification composition is formed from a polymer (such as a polycarbonate or a polyetherimide (PEI) as described below) dissolved in an organic solvent. The solvent is selected to dissolve the polymer to the desired degree as described below; to have a boiling point less than water under the process conditions of forming the particles; and to be sufficiently immiscible with water to form an emulsion with water.

In some embodiments, the polymer concentration in the solvent is less than 10% by weight of polymer (sometimes referred to in the art as "less than 10% solids"), and in other embodiments the polymer concentration is 10% or higher (sometimes referred to in the art as "10% or higher solids"), preferably 20% or higher solids. In some embodiments the polymer concentration is 12% or higher, or 15% or higher, or 20% or higher, for example 12% to 60% by weight, or 15% to 45% by weight, or 18% to 30% by weight. Polymer concentration is determined according to Equation 1.

$$\text{Polymer concentration in solvent} = \frac{(\text{polymer weight, g})}{((\text{polymer weight, g}) + (\text{solvent weight, g}))} \quad (\text{Eq. 1})$$

The organic solvent is accordingly selected to fully dissolve the polymer at the foregoing concentrations. Although a polymer concentration of only up to 10% is required in some embodiments, preferably the polymer is highly soluble, since the more soluble the polymer, the higher the amount of polymer that can be processed for a given volume of the organic solvent, and the more efficient and cost-effective the process.

The organic solvent is further selected to have a boiling point that is less than the boiling point of water under the conditions of particle formation. For example, where the particles are formed at atmospheric pressure, the organic solvent is selected to have a boiling point of less than 100° C., preferably less than 90° C., more preferably less than 80° C. at atmospheric pressure. Lower boiling points, e.g., 30 to 70° C. are preferred to minimize the amount of energy used in the process.

The solvent is still further selected to be sufficiently immiscible with water to form an emulsion with water under the process conditions used, in particular in the presence of the polymer at the desired concentration. A wide variety of organic solvents can meet the foregoing conditions, in particular halogenated solvents. Specific examples of halogenated solvents that meet these conditions include chloroform, dichloromethane, dichloroethane, or a combination comprising at least one of the foregoing can be used. The polymer can be manufactured and isolated, then dissolved in the organic solvent, or if the polymer is manufactured in a suitable solvent, a solution of the as-manufactured polymer can be used. For example, a solvent often used in the manufacture of polyimides, specifically polyetherimides is dichloromethane, and a solution the as-manufactured polyimide or polyetherimide can be used to provide the polymer solution.

The polymer solution is combined with deionized water (DI water) and a surfactant to form an emulsification composition. Where the polymer concentration in the organic solvent is less than 10% by weight of polymer, the organic fraction can be 0.60 or higher by volume. Where the polymer concentration in the organic solvent is 10% or higher, or 12% or higher, or 15% or higher, or 20% or higher, for example 15% to 35%, the organic fraction can be 0.75 by volume or higher. In some embodiments, the organic fraction is 0.9 or higher. The organic fraction is determined according to Equation 2.

$$\text{Organic Fraction} = \frac{(\text{Organic solvent volume})}{((\text{organic solvent volume}) + (\text{water volume}))} \quad \text{Eq. 2}$$

The upper limit of the organic fraction is theoretically only limited by the ability of the emulsification composition to form an emulsion and the desired particle sizes. However, the upper limit can be further selected so minimize the amount of organic solvent so as to improve efficiency and costs. In some embodiments the upper limit of the organic faction is less than 1.2, or less than 1.0, or less than 0.9, for example 0.6 to 0.9.

Surfactants that can be used as the first surfactant, second surfactant, or third surfactant include anionic surfactants, cationic surfactants, and non-ionic surfactants, or a combination comprising at least one of the foregoing. Examples of anionic surfactants include ammonium lauryl sulfate, dioctyl sodium sulfosuccinate, perfluorobutane sulfonic acid, perfluorononanoic acid, perfluorooctane sulfonic acid, perfluorooctanoic acid, potassium lauryl sulfate, sodium dodecyl sulfate, sodium dodecylbenzenesulfonate, sodium laureth sulfate, sodium lauroyl sarcosinate, sodium myreth sulfate, sodium pareth sulfate, and sodium stearate.

Examples of such cationic surfactants include benzalkonium chloride, benzethonium chloride, 5-bromo-5-nitro-1, 3-dioxane, cetrimonium bromide (cetyl trimethylammonium bromide), cetyl trimethylammonium chloride, dimethyldioctadecylammonium chloride, lauryl methyl gluceth-10 hydroxypropyl dimonium chloride, and tetramethylammonium hydroxide.

Examples of such nonionic surfactants include polyoxyethylene glycol alkyl ethers, polyoxyethylene glycol alkylphenol ethers, polyoxypropylene glycol alkyl ethers, glucoside alkyl ethers, polyoxyethylene glycol octylphenol ethers, glycerol alkyl esters, polyoxyethylene glycol sorbitan alkyl esters, sorbitan alkyl esters, cocamide monoethanolamine, cocamide diethanolamine, dodecyldimethylamine oxide, block copolymers of polyethylene glycol and polypropylene glycol, and polyethoxylated tallow amine. In an embodiment, the surfactant is sodium dodecylbenzenesulfonate.

The first surfactant is present in the emulsification composition in concentrations effective to produce particles having a Dv100 (volume-based diameter) of less than 10 micrometers. As discussed below, several factors influence the amount of surfactant required, including the polymer concentration in the organic solvent and the organic fraction. In some embodiments, the amount of surfactant present during the emulsification is 500 to 100,000 parts per million (ppm), based on the parts by weight of the water present in the emulsification composition. For example, the surfactant can be present in an amount of 1,000 ppm to about 70,000 ppm, based on the amount of water. In other embodiments, the amount of surfactant can be 3,000 ppm to 50,000 ppm based on the amount of water. In another embodiment, the amount of surfactant can be 6,000 ppm to 15,000 ppm based on the amount of water.

The emulsification composition can be emulsified by combining the polymer solution with deionized water and the surfactant under conditions known in the art to produce an emulsion, for example by sonication or agitation. The order of addition and the particular operations can vary, for example the polymer solution, deionized water, and surfactant can be pre-combined, and then emulsified, the deionized water and first surfactant can be combined and added to the polymer solution, or emulsifying can be carried out while combining the polymer solution, deionized water, and first surfactant. A defoaming agent can be present in the emulsification composition or added to the emulsion during or after formation thereof.

The emulsion can be stored, or transferred directly into deionized receiving water to induce particle formation. The receiving water is also deionized. A defoaming agent, second surfactant, or both can be present in the receiving water. The second surfactant can be the same as the first surfactant present in the emulsification composition. Preferably, the emulsion is transferred drop wise into the receiving water, for example by spraying through a nozzle into the receiving water.

During or after the emulsion is transferred into the receiving water, the process further comprises removing the organic solvent to provide an aqueous slurry comprising the particulate polymer. Preferably, the organic solvent is removed by heating the combined emulsion and receiving water above the boiling point of the organic solvent. In a specific embodiment, the receiving water is maintained at a temperature from 60 to 200° C., or 70 to 190° C., or 80 to 180° C., or 90 to 170° C. For example, according to certain preferred embodiments, the receiving water is adjusted to the desired temperature, before contacting with the emulsion, for example 70° C. to 150° C., and maintained at that temperature during the contacting. Vacuum can be applied during the contacting or after the contacting to assist removal of the organic solvent. In some embodiments, greater than 80%, or greater than 90%, or greater than 95% of the organic solvent is removed from the aqueous slurry.

An aspect of this disclosure is an aqueous slurry containing the polymer particles. In some embodiments the aqueous slurry can further comprise an additive composition. The additive composition is generally added to the aqueous slurry after it is formed, although some components (e.g., a dye) can be present during manufacture. The additive composition can include one or more components to improve processing or the properties of the aqueous slurry, or to improve processing or properties of a composition or article made from the slurry. For example, the additive composition for the aqueous slurry can comprise a stabilizer, a colorant, a filler, a polymer latex, a coalescing agent, a cosolvent, a third surfactant different from the first surfactant, or a combination comprising at least one of the foregoing, each in an amount from 0.1 to 20 weight percent (wt %), from 0.1 to 10 wt %, or from 1 to 10 wt %, based on the weight of the spherical particles. For example, the additive composition can comprise a coalescing agent. A coalescing agent can improve the process of forming a film from the slurry. In another embodiment, the additive composition can comprise a surfactant that can be the same as or different from the first or second surfactants. A surfactant can improve the dispersion of components of the slurry.

The particular polymer can be isolated from the aqueous slurry. For example, the aqueous slurry can be centrifuged and the supernatant removed from the solid; or the aqueous slurry can be filtered to provide a filtrate. The solid or filtrate can be washed with deionized water one or more times. The washed solid or filtrate can be dried under vacuum to provide the particulate polymer.

The polymer particles, and in particular polycarbonate or polyetherimide particles produced by these methods can have a Dv100 (volume-based diameter) of less than 10 micrometers, or less than 5 micrometers, or less than 3 micrometers. For example, the polymer particles, and in particular polycarbonate or polyetherimide particles produced by these methods can have a Dv100 (volume-based diameter) of 0.01 to 10 micrometers, for example 0.01 to 5 micrometers, or 0.01 to 3 micrometers. In another embodiment the polymer particles, and in particular polycarbonate or polyetherimide particles produced by these methods can have a Dv100 (volume-based diameter) of 0.1 to 10 micrometers, or 0.1 to 5 micrometers, or 0.1 to 3 micrometers. In still another embodiment the polymer particles, and in particular polycarbonate or polyetherimide particles produced by these methods can have a Dv100 (volume-based diameter) of 1 to 10 micrometers, or 1 to 5 micrometers or 1 to 3 micrometers. Particle diameter can be measured using laser diffraction.

In another advantageous feature, the polymer particles are spherical, which as used herein includes populations of particles wherein some of the particles deviate from a perfect sphere. The sphericity of a particle can be determined using image analyzer which identifies and measures a particles image in the form of a sphere, and calculates the sphericity of the particle as described above. Da/Dp (where Da=(4A/π); Dp=P/π; A=pixel area; P=pixel perimeter), which can be a value from zero to one, with one representing a sphere. For example, in some embodiments, the particles, and in particular polycarbonate or polyetherimide particles produced by these methods can have an average sphericity of 0.85 to 1, or 0.90 to 0.99, or 0.93 to 0.99, or 0.96 to 0.99, or 0.97 to 0.99.

In some embodiments, the isolated polymer particles are combined with an additive composition to improve the processing or properties of the particles or of an article made from the particles. The additive composition can include a particulate filler, antioxidant, heat stabilizer, light stabilizer, ultraviolet light stabilizer, ultraviolet UV) light absorbing additive, near-infrared (NIR) light absorbing additive, infrared (IR) absorbing additive, plasticizer, lubricant, release agent, antistatic agent, anti-fog agent, antimicrobial agent, colorant, laser marking additive, surface effect additive, radiation stabilizer, flame retardant, anti-drip agent, fragrance, fiber, flow promoter, or a combination comprising at least one of the foregoing. In an embodiment the additive composition comprises a colorant, or other additive to affect the appearance or odor of an article made from the polymer particles, such as a laser marking additive, surface effect additive, or a fragrance. Other additives can be selected to improve stability or durability of the articles made from the polymer particles, for example a particulate filler, fiber, antioxidant, heat stabilizer, light stabilizer, UV light stabilizer, UV absorbing additive, NIR absorbing additive, IR absorbing additive, anti-fog agent, antimicrobial agent, radiation stabilizer, or flame retardant. Other components are preferably added to improve processability of the polymer particles, such components including plasticizer, lubricant, release agent, and antistatic agent. The various additives are present in amounts known to be effective in the art.

In some embodiments, the spherical polymer particles are combined with a flow promoter. The flow promoter can help the particles flow smoothly during processing in particle production, collection, packaging, melting, extrusion, molding, or other procedures. The flow promoters can be materials that coat the particles and prevent the particles clumping together or sticking to processing machinery and other surfaces. The flow promoter can be combined with the polymer particles in an amount of 0.001 to 2 wt %, or 0.001 to 1 wt %, or 0.01 to 1 wt %, based on the weight of the spherical polymer particles. The flow promoter can be an unmodified fumed metal oxide, a hydrophobic fumed metal oxide, a hydrophilic fumed metal oxide, hydrated silica, amorphous alumina, glassy silica, glassy phosphate, glassy borate, glassy oxide, titania, talc, mica, kaolin, attapulgite, calcium silicate, magnesium silicate, or a combination comprising at least one of the foregoing. Fumed silica, fumed aluminum oxide, or a combination comprising at least one of the foregoing are especially useful, particularly fumed silica.

The polymer particles and composition comprising the polymer particles having the foregoing sizes and sphericity are useful in a wide variety of applications known in the art. The particles can be highly flowable, and are thus suitable for sizing fibers, forming coatings, or for three-dimensional (i.e., additive) manufacturing. Coatings formed from the powders can be highly conformal and even. Accordingly, in an embodiment, an article is provided including the polymer particles of the preceding methods, i.e., manufactured from the polymer particles. In some embodiments, the article is a sizing, a tie layer, a coating, an adhesive, a composite unidirectional tape, or a three-dimensional printed article. For example the tie layer can be a tie layer to bond metal to a fluoropolymer, such as a cookware coating tie layer. The coating can be an epoxy-toughening coating. The polymer particles are well-suited to produce uniform coatings for a variety of purposes, for example by for powder coating, inkjet printing, or 3-dimensional manufacturing. The coatings can be disposed on an injection molded article, an extruded article, an electrical conductor, an optical article, a wood article, a glass article, a carbon article, a plastic article, or a fiber, preferably a ceramic fiber, a carbon fiber, a glass fiber, a boron fiber, a silicon fiber, an aluminum fiber, a zirconium fiber, or a combination including at least one of the foregoing.

The processes, compositions, and articles described herein are particularly useful for thermoplastic polymers, in particular thermoplastic, high performance polymers. High performance polymers are generally aromatic and can have a decomposition temperature of 180° C. or higher, for example 200 to 400° C. Such polymers can also be referred to as engineering thermoplastics. High performance polymers as used herein include polyamides, polyamideimides, polyarylene ether ketones (including polyether ether ketones (PEEK), polyether ketone ketones (PEKK), and the like), polyarylene sulfones (including polyethersulfones (PES), polyphenylenesulfones (PPS), and the like) polycarbonates, polyetherimides, polyphenylene oxides (PPO), polyphenylene sulfides (PPS), polyphenylenesulfone ureas, self-reinforced polyphenylene (SRP), or polyphthalamides (PPA). The foregoing polymers can be linear or branched, and be homopolymers or copolymers, for example poly(etherimide-siloxane) or copolycarbonates containing two different types of carbonate units, for example bisphenol A units and units different from bisphenol A. The copolymers can be random, alternating, graft, or block copolymers having two or more blocks of different homopolymers. A combination of at least two different polymers can be used.

In some embodiments, the polymer is a polycarbonate, in particular a homopolymer or copolymer having repeating structural carbonate units of the formula (1)

wherein at least 60 percent of the total number of $R^1$ groups are aromatic, or each $R^1$ contains at least one $C_{6-30}$ aromatic group. Polycarbonates and their methods of manufacture are known in the art, being described, for example, in WO 2013/175448 A1, US 2014/0295363, and WO 2014/072923. A specific copolycarbonate includes bisphenol A and bulky bisphenol carbonate units, i.e., derived from bisphenols containing at least 12 carbon atoms, for example 12 to 60 carbon atoms or 20 to 40 carbon atoms. Examples of such copolycarbonates include copolycarbonates comprising bisphenol A carbonate units and 2-phenyl-3,3'-bis(4-hydroxyphenyl) phthalimidine carbonate units (a BPA-PPPBP copolymer, commercially available under the trade name XHT from SABIC), a copolymer comprising bisphenol A carbonate units and 1,1-bis(4-hydroxy-3-methylphenyl)cyclohexane carbonate units (a BPA-DMBPC copolymer commercially available under the trade name DMC from SABIC), and a copolymer comprising bisphenol A carbonate units and isophorone bisphenol carbonate units (available, for example, under the trade name APEC from Bayer).

In some embodiments the polymer is a polyimide comprising more than 1, for example 5 to 1000, or 5 to 500, or 10 to 100, structural units of formula (1)

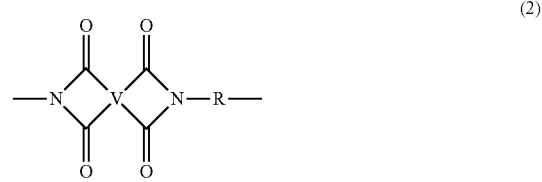

wherein each V is the same or different, and is a substituted or unsubstituted tetravalent $C_{4-40}$ hydrocarbon group, for example a substituted or unsubstituted $C_{6-20}$ aromatic hydrocarbon group, a substituted or unsubstituted, straight or branched chain, saturated or unsaturated $C_{2-20}$ aliphatic group, or a substituted or unsubstituted $C_{4-8}$ cycloalkylene group or a halogenated derivative thereof, in particular a substituted or unsubstituted $C_{6-20}$ aromatic hydrocarbon group. Exemplary aromatic hydrocarbon groups include any of those of the formulas

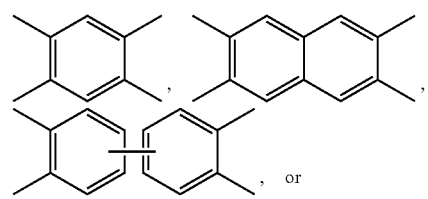

-continued

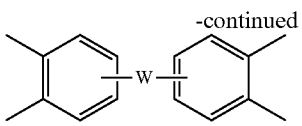

wherein W is —O—, —S—, —C(O)—, —SO$_2$—, —SO—, —C$_y$H$_{2y}$— wherein y is an integer from 1 to 5 or a halogenated derivative thereof (which includes perfluoroalkylene groups), or a group of the formula T as described in formula (3) below.

Each R in formula (1) is the same or different, and is a substituted or unsubstituted divalent organic group, such as a C$_{6-20}$ aromatic hydrocarbon group or a halogenated derivative thereof, a straight or branched chain C$_{2-20}$ alkylene group or a halogenated derivative thereof, a C$_{3-8}$ cycloalkylene group or halogenated derivative thereof, in particular a divalent group of formulas (3)

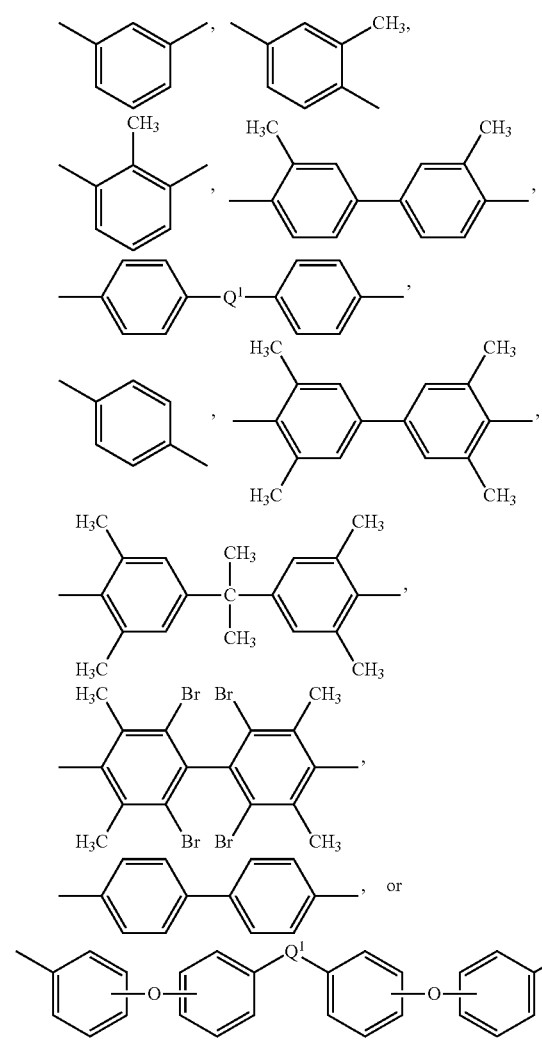

(3)

wherein Q$^1$ is —O—, —S—, —C(O)—, —SO$_2$—, —SO—, —C$_y$H$_{2y}$— wherein y is an integer from 1 to 5 or a halogenated derivative thereof (which includes perfluoroalkylene groups), or —(C$_6$H$_{10}$)$_z$— wherein z is an integer from 1 to 4. In an embodiment R is m-phenylene, p-phenylene, or a diphenylene sulfone.

Polyetherimides are a class of polyimides that comprise more than 1, for example 10 to 1000, or 10 to 500, structural units of formula (4)

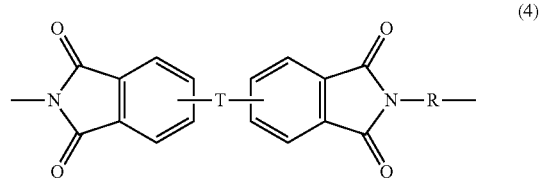

(4)

wherein each R is the same or different, and is as described in formula (1). Further in formula (4), T is —O— or a group of the formula —O—Z—O— wherein the divalent bonds of the —O— or the —O—Z—O— group are in the 3,3', 3,4', 4,3', or the 4,4' positions. The group Z in —O—Z—O— is a substituted or unsubstituted divalent organic group, and can be an aromatic C$_{6-24}$ monocyclic or polycyclic moiety optionally substituted with 1 to 6 C$_{1-8}$ alkyl groups, 1 to 8 halogen atoms, or a combination comprising at least one of the foregoing, provided that the valence of Z is not exceeded. Exemplary groups Z include groups derived from a dihydroxy compound of formula (5)

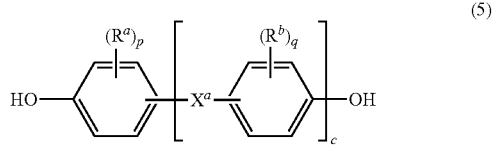

(5)

wherein R$^a$ and R$^b$ can be the same or different and are a halogen atom or a monovalent C$_{1-6}$ alkyl group, for example; p and q are each independently integers of 0 to 4; c is 0 to 4; and X$^a$ is a bridging group connecting the hydroxy-substituted aromatic groups, where the bridging group and the hydroxy substituent of each C$_6$ arylene group are disposed ortho, meta, or para (specifically para) to each other on the C$_6$ arylene group. The bridging group X$^a$ can be a single bond, —O—, —S—, —S(O)—, —S(O)$_2$—, —C(O)—, or a C$_{1-18}$ organic bridging group. The C$_{1-18}$ organic bridging group can be cyclic or acyclic, aromatic or non-aromatic, and can further comprise heteroatoms such as halogens, oxygen, nitrogen, sulfur, silicon, or phosphorous. The C$_{1-18}$ organic group can be disposed such that the C$_6$ arylene groups connected thereto are each connected to a common alkylidene carbon or to different carbons of the C$_{1-18}$ organic bridging group. A specific example of a group Z is a divalent group of formula (5a)

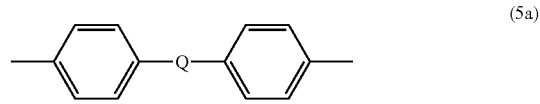

(5a)

wherein Q is —O—, —S—, —C(O)—, —SO$_2$—, —SO—, or —C$_y$H$_{2y}$— wherein y is an integer from 1 to 5 or a halogenated derivative thereof (including a perfluoroalkylene group). In a specific embodiment Z is a derived from bisphenol A, such that Q in formula (3a) is 2,2-isopropylidene.

In an embodiment in formula (4) R is m-phenylene or p-phenylene and T is —O—Z—O— wherein Z is a divalent group of formula (4a). Alternatively, R is m-phenylene or p-phenylene and T is —O—Z—O wherein Z is a divalent group of formula (4a) and Q is 2,2-isopropylidene.

In some embodiments, the polyetherimide can be a copolymer, for example, a polyetherimide sulfone copolymer comprising structural units of formula (3) wherein at least 10 mole percent of the R groups are of formula (3) wherein $Q^1$ is —SO$_2$— and the remaining R groups are independently p-phenylene or m-phenylene or a combination comprising at least one of the foregoing; and Z is 2,2'-(4-phenylene) isopropylidene. For example 10 to 90 mole percent, 10 to 80 mole percent, 20 to 70 mole percent, or 20 to 60 mole percent of the R groups comprises 4,4'-diphenylene sulfone, with the remainder being m-phenylene or p-phenylene, and Z comprises 4,4'-diphenylene isopropylidene.

Alternatively, the polyetherimide copolymer optionally comprises additional structural imide units, for example imide units of formula (1) wherein R and V are as described in formula (1), for example V is

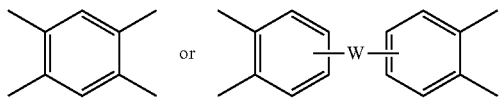

wherein W is a single bond, —S—, —C(O)—, —SO$_2$—, —SO—, or —C$_y$H$_{2y}$— wherein y is an integer from 1 to 5 or a halogenated derivative thereof (which includes perfluoroalkylene groups). These additional structural imide units preferably comprise less than 20 mol % of the total number of units, and more preferably can be present in amounts of 0 to 10 mol % of the total number of units, or 0 to 5 mol % of the total number of units, or 0 to 2 mole % of the total number of units. In some embodiments, no additional imide units are present in the polyetherimide.

In another embodiment the polyetherimide can be a polyetherimide-siloxane block or graft copolymer. Block polyimide-siloxane copolymers comprise imide units and siloxane blocks in the polymer backbone. Block polyetherimide-siloxane copolymers comprise etherimide units and siloxane blocks in the polymer backbone. The imide or etherimide units and the siloxane blocks can be present in random order, as blocks (i.e., AABB), alternating (i.e., ABAB), or a combination thereof. Graft copolymers are non-linear copolymers comprising the siloxane blocks connected to linear or branched polymer backbone comprising imide or etherimide blocks. In an embodiment, a polyetherimide-siloxane has 5 to 250, or 5 to 100 units of the formula

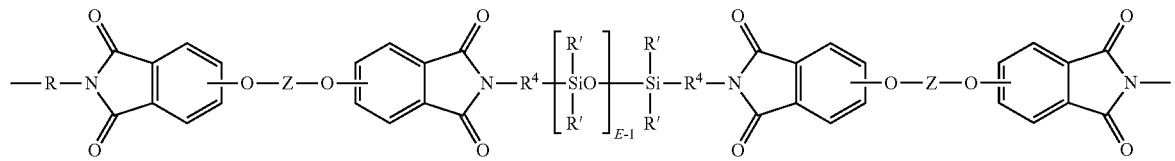

wherein E has an average value of 2 to 100, 2 to 31, 5 to 75, 5 to 60, 5 to 15, or 15 to 40; each R' is independently a C$_{1-13}$ monovalent hydrocarbyl group, for example, each R' can independently be a C$_{1-13}$ alkyl group, C$_{1-13}$ alkoxy group, C$_{6-14}$ aryl group, or C$_{6-10}$ aryloxy group, wherein each of the foregoing groups can be substituted or unsubstituted; each R$^4$ is independently a C$_6$-C$_{20}$ arylene or C$_2$-C$_{20}$ alkylene; and R and Z are as described in formula (2). In a specific embodiment, R is a phenylene, Z is a residue of bisphenol A, R$^4$ is n-propylene, E is 2 to 50, 5, to 30, or 10 to 40, and each R' is methyl. In an embodiment the polyetherimide-siloxane comprises 10 to 50 weight %, 10 to 40 weight %, or 20 to 35 weight % polysiloxane units, based on the total weight of the polyetherimide-siloxane.

The invention is further described in the following non-limiting, illustrative examples in which all parts and percentages are by weight unless otherwise indicated.

EXAMPLES

The following materials were used in the Examples.

| MATERIAL | DESCRIPTION | SOURCE |
|---|---|---|
| PEI-1 | Polyetherimide (ULTEM* 1000) | SABIC |
| PEI-2 | Polyetherimide (ULTEM* 1040) | SABIC |
| PC-1 | p-Cumylphenol capped poly(65 mole % BPA carbonate)-co-(35 mole % 3,3-bis(4-hydroxyphenyl)-2-phenyl-isoindolin-1-one (PPPBP) carbonate) copolymer (MW = 25,000 Daltons); polycarbonate copolymer (LEXAN* XHT) | SABIC |
| PC-2 | Bisphenol A polycarbonate (LEXAN* 100) | SABIC |
| SDBS | Sodium dodecyl benzene sulfonate (surfactant) | Pilot Chemical Co. |

Procedure for Emulsion Preparation

The thermoplastic polymer was dissolved in an organic solvent, methylene chloride (CH$_2$Cl$_2$) unless otherwise noted, using a shaker table. This resulted in a polymer solution without any visible suspended particles. Deionized (DI) water and surfactant were added to the polymer solution. Emulsification was carried out with high shear agitation (10,000 rpm), which resulted in a polymer emulsion which remained stable for more than one month.

Emulsion Drying Process

The emulsion prepared above was slowly transferred to another vessel containing DI water (called "receiving water") which was maintained at a temperature greater than 70° C. Optionally, the receiving water can contain a surfactant. The methylene chloride was driven off from the receiving water and the disengaged solvent was captured via a cold water circulated condenser. Once all the organic solvent was removed to provide an aqueous slurry, the aqueous slurry was filtered through a 1-micron filter, washed three times with DI water, and dried at 160° C. under vacuum.

Characterization

The particle size distribution was measured in water using laser diffraction (Mastersizer 3000 from Malvern). The dry polymer powder was made into a slurry with DI water containing surfactant and sonicated for five minutes. The slurry was added to the Malvern reservoir, which contains DI water. The volume-based particle size distribution and number-based particle size distribution were measured. The obtained Dv100 or Dn100 value indicates that 100% of the particles (based on volume or number, respectively) are below the stated diameter.

The particle morphology was analyzed by optical microscopy. The dry polymer powder was made into a slurry in DI water. The slurry was spread very thin on a glass plate and allowed to dry. Optical images (100× magnification) were captured though a digital camera attached to an Olympus microscope.

Example 1

PEI-1 was dissolved in methylene chloride solvent to form a polymer solution. A known amount of deionized water and SDBS were added to the polymer solution. The resulting emulsification composition was emulsified using a hand held high shear mixer at 10,000 rpm for two minutes. This resulted in a stable emulsion. Due to light scattering, the emulsion appears to be "milky" in color.

Figure 2:
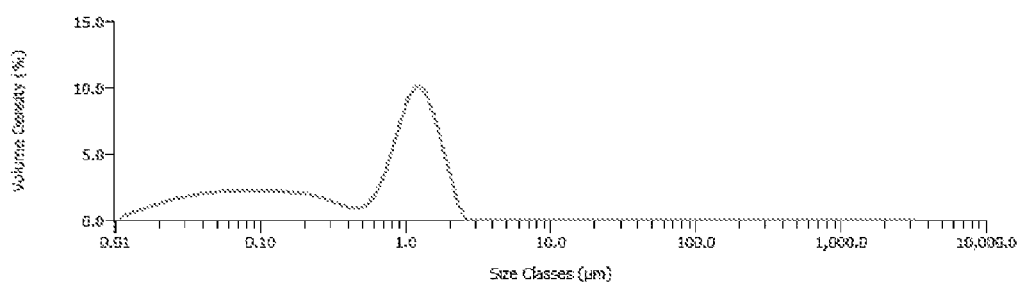
FIG. 2 is a graph showing particle size distribution of polyetherimide (ULTEM 1000) particles in Example 4 based on volume; Dv100 (volume-based diameter) is 2.42 microns.

The above-prepared emulsion was transferred drop by drop into another glass vessel containing DI water ("receiving water") and SDBS surfactant, which was maintained at greater than 70° C. Both the emulsion and the receiving water containing the polymer particles (aqueous slurry) were filtered using a 1-micron filter. The recovered particles were washed three times with DI water and dried at 160° C. under vacuum for 24 hours. The particle size distribution (based on volume) of the ultra-fine polymer powder was evaluated using laser diffraction (Mastersizer 3000 from Malvern). Results are shown in Table 1, in which Examples of the invention are designated with numbers and Comparative Examples are designated with letters.

natural logarithmic values. The linear regression analysis produced an acceptable model with R2 greater than 0.99, adjusted R2 greater than 0.99 and predicted R2 greater than 0.98. The plot of Dv100 against the polymer solution concentration as well as organic fraction is shown in FIG. 2. The Dv100 (volume-based diameter) dependence on polymer solution concentration, organic fraction, and surfactant concentration is given in Eq. 3.

$$ln(Dv100)=1.64+0.167*S-1.26*OF-0.83*SC \quad \text{Eq. 3.}$$

wherein:
ln(Dv100)=natural logarithmic value of Dv100 (volume-based diameter)
S=Solids % (polymer concentration in solvent)
OF=Organic fraction (0 for pure water and 1 for pure organic solvent) and
SC=Surfactant concentration.

It can be seen from the data presented above, as well as Eq. 1, that Dv100 (volume-based diameter) decreases when (a) the polymer concentration in solution decreases or (b) the organic fraction of the pre-emulsion emulsification composition increases; or (c) the surfactant concentration increases.

Example 2

Since reducing the polymer concentration in solution adversely affects the batch yield of the process, the micronization process as described above was repeated, where the organic solvent fraction and surfactant concentration were increased, while keeping the polymer concentration high (20% by weight or 25% by weight polymer concentration in methylene chloride).

TABLE 1

| Ex. | PEI-1, grams | $CH_2Cl_2$, grams | Water, grams | Polymer concentration in $CH_2Cl_2$, % | Organic Fraction | SDBS, grams | Dv100 (volume based diameter), micrometers |
|---|---|---|---|---|---|---|---|
| A | 15 | 52.6 | 26.3 | 22.20% | 0.60 | 0.18 | 66.6 |
| 1 | 15 | 135 | 67.5 | 10.00% | 0.60 | 0.24 | 9.45 |
| B | 15 | 52.6 | 26.3 | 22.20% | 0.60 | 0.18 | 75.8 |
| C | 15 | 66.5 | 99.8 | 18.40% | 0.33 | 0.24 | 61.3 |
| D | 15 | 60 | 60 | 20.00% | 0.43 | 0.12 | 97.5 |
| E | 15 | 135 | 67.5 | 10.00% | 0.60 | 0.06 | 12.7 |
| F | 15 | 135 | 202.5 | 10.00% | 0.33 | 0.18 | 14.5 |
| G | 15 | 35 | 17.5 | 30.00% | 0.60 | 0.24 | 368 |
| H | 15 | 35 | 52.5 | 30.00% | 0.33 | 0.06 | 401 |
| I | 15 | 135 | 202.5 | 10.00% | 0.33 | 0.18 | 16.4 |
| J | 15 | 35 | 43.4 | 30.00% | 0.38 | 0.12 | 433 |
| K | 15 | 135 | 145.8 | 10.00% | 0.41 | 0.24 | 14.9 |
| L | 15 | 60 | 90 | 20.00% | 0.33 | 0.06 | 86.3 |
| M | 15 | 44.3 | 44.3 | 25.30% | 0.43 | 0.06 | 210 |
| N | 15 | 60 | 60 | 20.00% | 0.43 | 0.12 | 75.8 |
| O | 15 | 89.2 | 89.2 | 14.40% | 0.43 | 0.06 | 27.6 |
| P | 15 | 35 | 43.4 | 30.00% | 0.38 | 0.12 | 452 |
| Q | 15 | 60 | 60 | 20.00% | 0.43 | 0.12 | 75.9 |
| R | 15 | 60 | 60 | 20.00% | 0.43 | 0.12 | 79.1 |
| S | 15 | 135 | 202.5 | 10.00% | 0.33 | 0.06 | 18.7 |
| T | 15 | 35 | 52.5 | 30.00% | 0.33 | 0.24 | 382 |
| U | 15 | 35 | 17.5 | 30.00% | 0.60 | 0.06 | 386 |

The results from Table 1 were analyzed using Design Expert software. The Dv100 values were transformed into Other polymers, PC-1 and PC-2, were also studied at optimum organic fractions and higher surfactant loadings.

Data for PEI-1, PE-2, PC-1, and PC-2 are shown in Table 2. FIG. 1 illustrates the effect of organic fraction and surfactant loading on the particle size of PEI-1 and PEI-2.

TABLE 2

| Run | Polymer | Polymer, grams | CH$_2$Cl$_2$, grams | Water, grams | Polymer concentration in CH$_2$Cl$_2$, % | Organic Fraction | SDBS, grams | Dv100 (volume-based diameter), micrometers |
|---|---|---|---|---|---|---|---|---|
| V | PEI-1 | 15 | 60 | 60 | 20% | 0.429 | 0.09 | 66.5 |
| W | PEI-1 | 15 | 60 | 45 | 20% | 0.501 | 0.09 | 58.7 |
| X | PEI-1 | 15 | 60 | 30 | 20% | 0.601 | 0.09 | 27.3 |
| 2 | PEI-1 | 15 | 60 | 15 | 20% | 0.750 | 0.09 | 8.68 |
| 3 | PEI-1 | 15 | 60 | 6 | 20% | 0.883 | 0.09 | 5.91 |
| 4 | PEI-1 | 15 | 60 | 6 | 20% | 0.883 | 0.3 | 2.42 |
| Y | PEI-2 | 15 | 45 | 45 | 25% | 0.429 | 0.12 | 45.5 |
| Z | PEI-2 | 15 | 45 | 34 | 25% | 0.499 | 0.12 | 35.1 |
| ZA | PEI-2 | 15 | 45 | 22.5 | 25% | 0.601 | 0.12 | 23.9 |
| 5 | PEI-2 | 15 | 45 | 11.5 | 25% | 0.746 | 0.12 | 7.64 |
| 6 | PC-1 | 15 | 60 | 6 | 20% | 0.883 | 0.3 | 2.23 |
| 7 | PC-2 | 15 | 60 | 6 | 20% | 0.883 | 0.3 | 2.75 |

It can be seen that with a 10% polymer concentration in organic solvent, Dv100 (volume-based diameter) below 10 microns can be achieved by optimizing the organic fraction and surfactant loading (Example 1 and Comparative Examples A-E).

It can be seen that even at high polymer content in organic solvent (20-25%), Dv100 (volume-based diameter) below 10 microns can be achieved by increasing the organic fraction and surfactant loading for both PEI (Examples 2-5) and polycarbonate (Examples 6-7).

The data for PEI-1 show that polymer particles prepared according to the invention and having an organic fraction of 0.75 or greater surprisingly had Dv100 (volume-based diameter) less than 10 microns, where in contrast organic fractions of 0.4, 0.5, and 0.6 produced particles with Dv100 (volume-based diameter) above 25 microns.

The data for PEI-2 show that polymer particles prepared according to the invention and having an organic fraction of 0.75 or greater surprisingly have Dv100 (volume-based diameter) less than 10, where, in contrast, organic fractions of 0.4, 0.5, and 0.6 produced particles having Dv100 (volume-based diameter) above 20.

Figure 3:
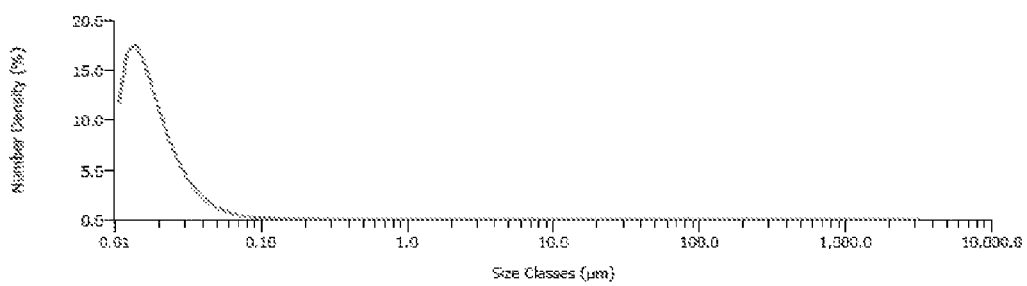
FIG. 3 is a graph showing particle size distribution of polyetherimide (ULTEM 1000) particles in Example 4 based on number; Dn100 (number-based diameter) is 0.43 microns.

The volume based particle size distribution and number based particle size distribution of PEI-1 (Example 4) are shown in FIG. 2 and FIG. 3, respectively. It can be seen that Dn100 (number-based diameter) is significantly lower compared to Dv100 (volume-based diameter) for PEI-1 (FIGS. 2 and 3).

Figure 4:
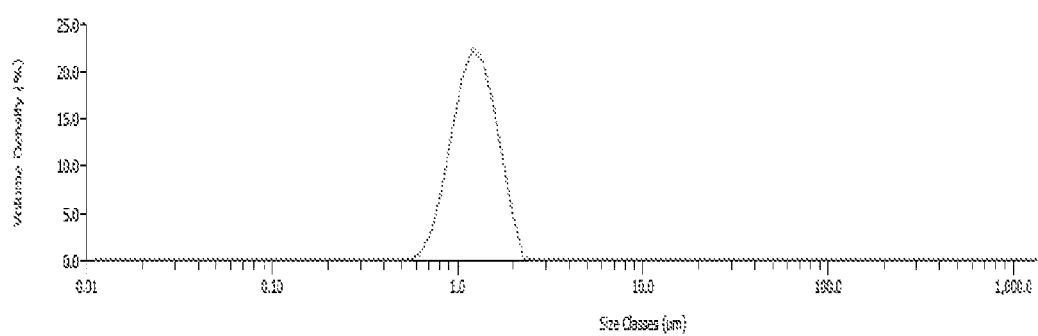
FIG. 4 is a graph showing particle size distribution of polycarbonate copolymer (LEXAN XHT (PC-1)) particles based on volume in Example 6; Dv100 (volume-based diameter) is 2.23 microns.
Figure 5:
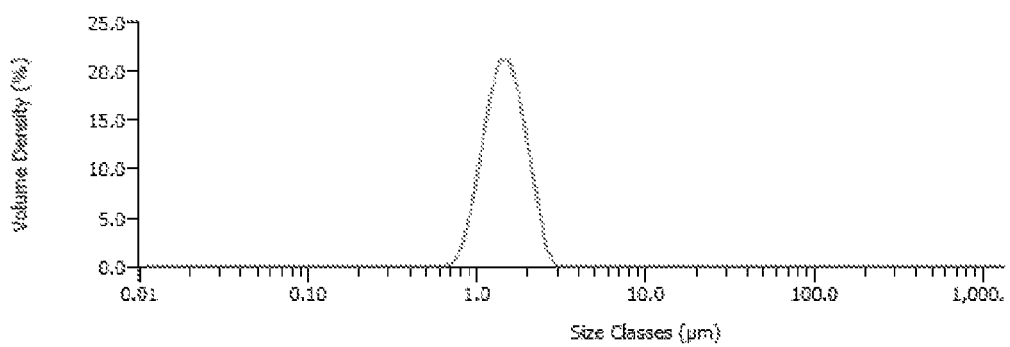
FIG. 5 is a graph showing particle size distribution of a polycarbonate homopolymer (LEXAN 100 (PC-2)) particles in Example 7 based on volume; Dv100 (volume-based diameter) is 2.75 microns.

The particle size distribution (volume-based) for PC-1 and PC-2 are shown in FIG. 4 and FIG. 5. It can be seen that both PC-1 and PC-2 particles have fewer sub-micron particles compared to PEI-1.

Figure 6:
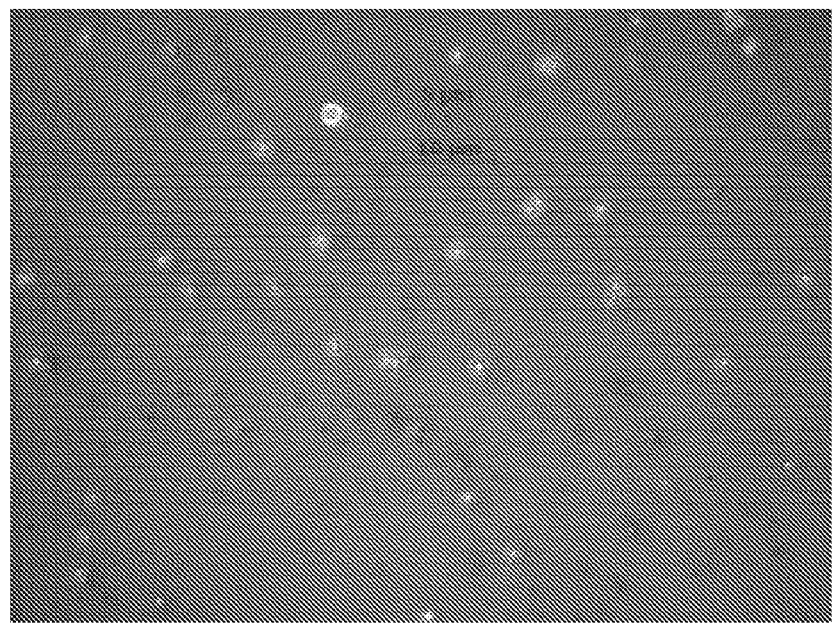
FIG. 6 is an optical microscope picture of polyetherimide (ULTEM 1000 (PEI-1)) particles of Example 4; Dv100 (volume-based diameter) is 2.42 microns.
Figure 7:
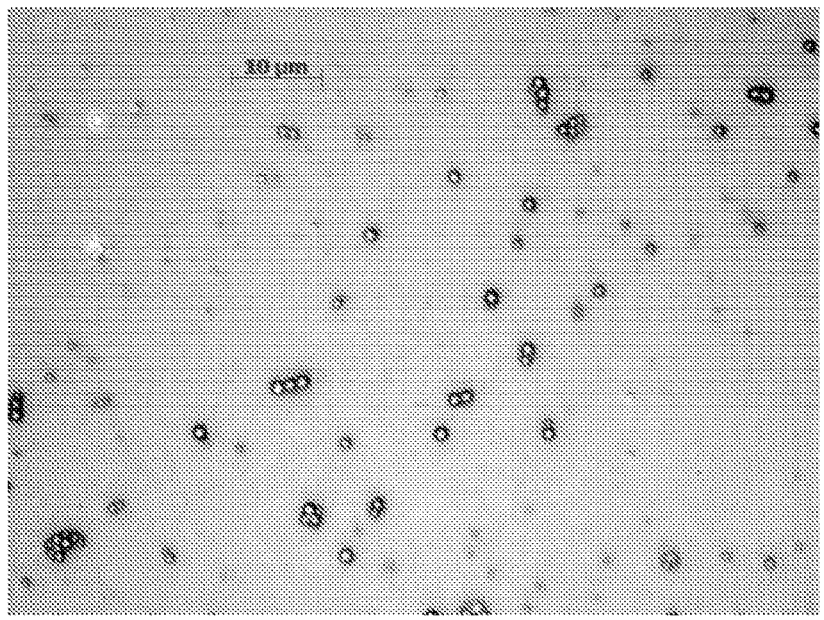
FIG. 7 is an optical microscope image of the particles of Example 6; Dv100 (volume-based diameter) is 2.23 microns.
Figure 8:
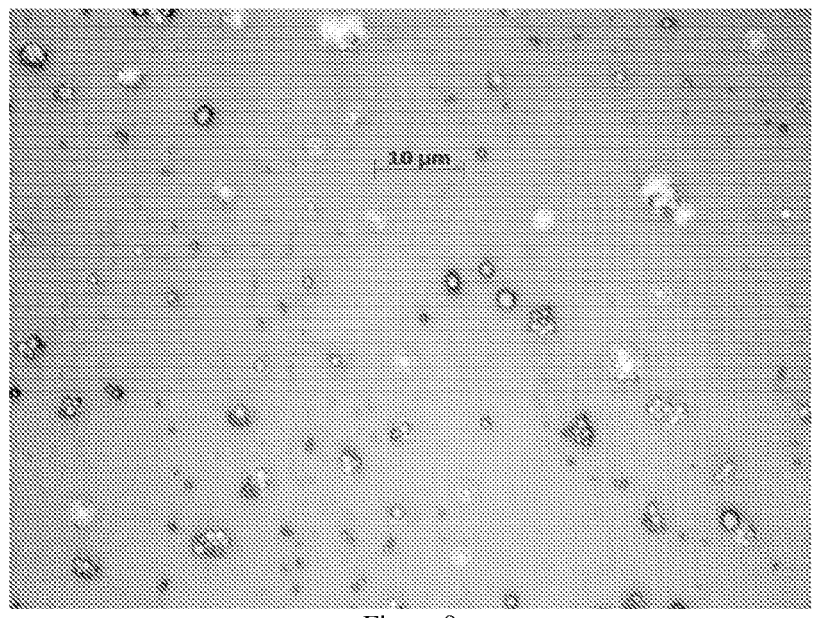
FIG. 8 is an optical microscope image of the particles of Example 7; Dv100 (volume-based diameter) is 2.75 microns.

The special nature of the particles was confirmed via optical micrographs of PEI-1 (Example 4), PC-1 (Example 6), and PC-2 (Example 7) as shown in FIGS. 6 to 8, respectively. In particular, it can be seen that the particles are spherical as described above. The polyetherimide or polycarbonate particles can have an average sphericity of 0.85 to 1, or 0.90 to 0.99, or 0.93 to 0.99, or 0.96 to 0.99, or 0.97 to 0.99.

The claims are further illustrated by the following Embodiments, which are not intended to be limiting.

Embodiment 1

A method for making spherical polymer particles, the method comprising: providing a polymer solution comprising a polymer in an amount of less than 10% by weight, based on the total weight of the polymer solution, and an organic solvent; combining the polymer solution, deionized water, and a first surfactant to provide an emulsification composition having an organic solvent fraction of 0.60 or higher by volume; forming an emulsion from the emulsification composition; and adding the emulsion into receiving water maintained at a temperature above the boiling point of the organic solvent for a period sufficient to evaporate the organic solvent, wherein the adding and the evaporating are at a rate effective to form an aqueous slurry comprising spherical polymer particles having a Dv100 (volume-based diameter) of 10 micrometers or less, as measured by laser diffraction.

Embodiment 2

A method for making spherical polymer particles, the method comprising: providing a polymer solution comprising a polymer in an amount of 10% by weight or higher, preferably an amount of 12% by weight or higher, or an amount of 15% by weight or higher, or an amount of 18% by weight or higher, and an organic solvent; combining the polymer solution, the deionized water, and a first surfactant, to form an emulsification composition having an organic solvent fraction of 0.75 or higher by volume; forming an emulsion from the emulsification composition; and adding the emulsion into deionized receiving water maintained at a temperature above the boiling point of the organic solvent for a period sufficient to evaporate the organic solvent, wherein the adding and the evaporating are at a rate effective to form an aqueous slurry comprising spherical polymer particles having a Dv100 (volume-based diameter) of 10 micrometers or less, as measured by laser diffraction.

Embodiment 3

The method of any one or more of the preceding embodiments, wherein the polymer is a thermoplastic polymer, preferably a polyamide, polyamideimide, polyarylene ether ketone, polyarylene sulfone, polycarbonate, polyetherimide, polyphenylene oxide, polyphenylene sulfide, polyphenylenesulfone urea, self-reinforced polyphenylene, or polyphthalamides, preferably a polyetherimide, a polyarylene sulfone, or a polycarbonate.

Embodiment 4

The method of any one or more of the preceding embodiments, wherein the polymer is a polyetherimide, a polyarylene sulfone, or a polycarbonate.

Embodiment 5

The method of any one or more of the preceding embodiments, wherein the organic solvent has a boiling point of less than 90° C. and is immiscible with water.

Embodiment 6

The method of any one or more of the preceding embodiments, wherein the first surfactant is an anionic surfactant, cationic surfactant or non-ionic surfactant, or a combination comprising at least one of the foregoing; preferably wherein the surfactant is ammonium lauryl sulfate, dioctyl sodium sulfosuccinate, perfluorobutane sulfonic acid, perfluorononanoic acid, perfluorooctane sulfonic acid, perfluorooctanoic acid, potassium lauryl sulfate, sodium dodecyl sulfate, sodium dodecylbenzenesulfonate, sodium laureth sulfate, sodium lauroyl sarcosinate, sodium myreth sulfate, sodium pareth sulfate, sodium stearate, or a combination comprising at least one of the foregoing.

Embodiment 7

The method of any one or more of the preceding embodiments, wherein the organic fraction is 0.60 to 0.90.

Embodiment 8

The method of any one or more of the preceding embodiments, wherein forming the emulsion is by agitating the emulsification composition.

Embodiment 9

The method of embodiment 8, wherein the agitating is under high shear at 7,000 to 10,000 rpm for 2 to 5 minutes, preferably at a temperature up to 90° C., under pressure.

Embodiment 10

The method of any one or more of the preceding embodiments, wherein the receiving water comprises a second surfactant, an anti-foaming agent, or both.

Embodiment 11

The method of any one or more of the preceding embodiments, wherein the emulsion is added to the receiving water in the form of droplets.

Embodiment 12

The method of any one or more of the preceding embodiments, further comprising heating the emulsion to up to 100° C. before adding the emulsion into the receiving water.

Embodiment 13

The method of any one or more of the preceding embodiments, further comprising isolating the formed spherical particles.

Embodiment 14

The method of embodiment 13, further comprising filtering the formed particles from the receiving water to provide filtered particles; washing the filtered particles in water to provide washed particles; and drying the washed particles at elevated temperatures, preferably at a temperature of 80° C. to 210° C., with or without the use of vacuum.

Embodiment 15

Spherical polymer particles having a Dv100 (volume-based diameter) of 10 micrometers or less, preferably 5 micrometers or less, more preferably 3 micrometers or less, prepared by the method of any one or more of the preceding embodiments.

Embodiment 16

The method of anyone or more of the preceding embodiments further comprising combining the spherical polymer particles with an additive composition comprising a particulate filler, antioxidant, heat stabilizer, light stabilizer, ultraviolet light stabilizer, UV light absorbing additive, NIR light absorbing additive, IR light absorbing additive, plasticizer, lubricant, release agent, antistatic agent, anti-fog agent, antimicrobial agent, colorant, laser marking additive, surface effect additive, radiation stabilizer, flame retardant, anti-drip agent, fragrance, fiber, flow promoter, or a combination comprising at least one of the foregoing, preferably a colorant.

Embodiment 17

The method of any one or more of the preceding embodiments, further comprising combining the spherical polymer particles with a flow promoter in an amount of 0.001 to 1 wt %, based on the weight of the spherical polymer particles, wherein the flow promoter can comprise an unmodified fumed metal oxide, a hydrophobic fumed metal oxide, a hydrophilic fumed metal oxide, hydrated silica, amorphous alumina, glassy silica, glassy phosphate, glassy borate, glassy oxide, titania, talc, mica, kaolin, attapulgite, calcium silicate, magnesium silicate, or a combination comprising at least one of the foregoing, preferably fumed silica, fumed aluminum oxide, or a combination comprising at least one of the foregoing, more preferably fumed silica.

Embodiment 18

The method of any one or more of the preceding embodiments, wherein the aqueous slurry further comprises an additive composition comprising a stabilizer, a colorant, a filler, a polymer latex, a coalescing agent, a cosolvent, a third surfactant different from the first surfactant, or a combination including at least one of the foregoing, each in an amount from 0.1 to 10 wt %, preferably wherein the additive is a coalescing agent.

Embodiment 19

An article prepared from the spherical polymer particles of any one or more of the preceding embodiments.

Embodiment 20

The article of embodiment 19, wherein the article is a sizing, a coating, a tie layer, an adhesive, a composite unidirectional tape, or a three-dimensional printed article, for example a tie layer to bond metal to a fluoropolymer such as a cookware coating tie layer, or a coating, for example a powder coating or an epoxy-toughening coating, wherein the coating can be disposed on an injection molded article, an extruded article, an electrical conductor, an optical article, a wood article, a glass article, a carbon article, a plastic article, or a fiber, for example a ceramic fiber, a carbon fiber, a glass fiber, a boron fiber, a silicon fiber, an aluminum fiber, or a zirconium fiber.

In general, the compositions and methods can alternatively comprise, consist of, or consist essentially of, any appropriate components or steps herein disclosed. The compositions and methods can additionally, or alternatively, be formulated so as to be devoid, or substantially free, of any steps, components, materials, ingredients, adjuvants or species used in the prior art compositions or that are otherwise not necessary to the achievement of the function and/or objectives of the present embodiments.

All ranges disclosed herein are inclusive of the endpoints, and the endpoints are independently combinable with each other. All numeric values are considered to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure. "Combination" is inclusive of blends, mixtures, alloys, reaction products, and the like. "Or" means "and/or." The terms "a" and "an" and "the" herein do not denote a limitation of quantity, and are to be construed to cover both the singular and the plural, unless otherwise indicated herein or clearly contradicted by context. Reference throughout the specification to "one embodiment," "another embodiment", "some embodiments," and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

As used herein, the term "hydrocarbyl" includes groups containing carbon, hydrogen, and optionally one or more heteroatoms (e.g., 1, 2, 3, or 4 atoms such as halogen, O, N, S, P, or Si). "Alkyl" means a branched or straight chain, saturated, monovalent hydrocarbon group, e.g., methyl, ethyl, i-propyl, and n-butyl. "Alkylene" means a straight or branched chain, saturated, divalent hydrocarbon group (e.g., methylene (—$CH_2$—) or propylene (—$(CH_2)_3$—)). "Alkenyl" and "alkenylene" mean a monovalent or divalent, respectively, straight or branched chain hydrocarbon group having at least one carbon-carbon double bond (e.g., ethenyl (—HC=$CH_2$) or propenylene (—HC($CH_3$)=$CH_2$—). "Alkynyl" means a straight or branched chain, monovalent hydrocarbon group having at least one carbon-carbon triple bond (e.g., ethynyl). "Alkoxy" means an alkyl group linked via an oxygen (i.e., alkyl-O—), for example methoxy, ethoxy, and sec-butyloxy. "Cycloalkyl" and "cycloalkylene" mean a monovalent and divalent cyclic hydrocarbon group, respectively, of the formula —$C_nH_{2n-x}$ and —$C_nH_{2n-2x}$— wherein x is the number of cyclization(s). "Aryl" means a monovalent, monocyclic, or polycyclic aromatic group (e.g., phenyl or naphthyl). "Arylene" means a divalent, monocyclic, or polycyclic aromatic group (e.g., phenylene or naphthylene). The prefix "halo" means a group or compound including one more halogen (F, Cl, Br, or I) substituents, which can be the same or different. The prefix "hetero" means a group or compound that includes at least one ring member that is a heteroatom (e.g., 1, 2, or 3 heteroatoms, wherein each heteroatom is independently N, O, S, or P.

"Substituted" means that the compound or group is substituted with at least one (e.g., 1, 2, 3, or 4) substituents instead of hydrogen, where each substituent is independently nitro (—$NO_2$), cyano (—CN), hydroxy (—OH), halogen, thiol (—SH), thiocyano (—SCN), $C_{1-6}$ alkyl, $C_{2-6}$ alkenyl, $C_{2-6}$ alkynyl, $C_{1-6}$ haloalkyl, $C_{1-9}$ alkoxy, $C_{1-6}$ haloalkoxy, $C_{3-12}$ cycloalkyl, $C_{5-18}$ cycloalkenyl, $C_{6-12}$ aryl, $C_{7-13}$ arylalkylene (e.g, benzyl), $C_{7-12}$ alkylarylene (e.g, toluyl), $C_{4-12}$ heterocycloalkyl, $C_{3-12}$ heteroaryl, $C_{1-6}$ alkyl sulfonyl (—S(=O)$_2$-alkyl), $C_{6-12}$ arylsulfonyl (—S(=O)$_2$-aryl), or tosyl ($CH_3C_6H_4SO_2$—), provided that the substituted atom's normal valence is not exceeded, and that the substitution does not significantly adversely affect the manufacture, stability, or desired property of the compound. When a compound is substituted, the indicated number of carbon atoms is the total number of carbon atoms in the group, including those of the substituent(s).

All cited patents, patent applications, and other references are incorporated herein by reference in their entirety. All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features. Thus, although the present invention has been described in considerable detail with reference to certain preferred versions thereof, other versions are possible. Therefore, the spirit and scope of the appended claims should not be limited to the description of the preferred versions contained herein.

I claim:

1. A method for making spherical polymer particles, the method comprising:
    providing a polymer solution comprising a polymer in an amount of 10% by weight or higher, and an organic solvent;
    combining the polymer solution, deionized water, and a first surfactant, to form an emulsification composition having an organic solvent fraction of 0.75 or higher by volume;
    forming an emulsion from the emulsification composition; and
    adding the emulsion into deionized receiving water maintained at a temperature above the boiling point of the organic solvent for a period sufficient to evaporate the organic solvent, wherein the adding and the evaporating are at a rate effective to form an aqueous slurry comprising spherical polymer particles having a Dv100 (volume-based diameter) of 10 micrometers or less, as measured by laser diffraction and having an average sphericity of 0.85 to 1.

2. The method of claim 1, wherein the polymer is a thermoplastic polymer.

3. The method of claim 1, wherein the polymer is a polyetherimide, a polyarylene sulfone, or a polycarbonate.

4. The method of claim 1, wherein the organic solvent has a boiling point of less than 90° C. and is immiscible with water.

5. The method of claim 1,
    wherein the first surfactant is an anionic surfactant, cationic surfactant or non-ionic surfactant, or a combination comprising at least one of the foregoing.

6. The method of claim 1, wherein forming the emulsion is by agitating the emulsification composition.

7. The method of claim 6, wherein the agitating is under high shear at 7,000 to 10,000 rpm for 2 to 5 minutes.

8. The method of claim 1, wherein the receiving water comprises a second surfactant, an anti-foaming agent, or both.

9. The method of claim 1, wherein the emulsion is added to the receiving water in the form of droplets.

10. The method of claim 1, further comprising heating the emulsion to up to 100° C. before adding the emulsion into the receiving water.

11. The method of claim 1, wherein the aqueous slurry further comprises an additive composition comprising a stabilizer, a colorant, a filler, a polymer latex, a coalescing agent, a cosolvent, a third surfactant different from the first surfactant, or a combination including at least one of the foregoing, each in an amount from 0.1 to 10 total weight percent.

12. The method of claim 1, further comprising isolating the formed spherical particles.

13. The method of claim 12, further comprising
filtering the formed particles from the receiving water to provide filtered particles;
washing the filtered particles in water to provide washed particles; and
drying the washed particles at a temperature of 80° C. to 210° C., with or without the use of vacuum.

14. The method of claim 1 further comprising combining the spherical polymer particles with an additive comprising a particulate filler, antioxidant, heat stabilizer, light stabilizer, ultraviolet light stabilizer, UV absorbing additive, NIR absorbing additive, IR absorbing additive, plasticizer, lubricant, release agent, antistatic agent, anti-fog agent, antimicrobial agent, colorant, laser marking additive, surface effect additive, radiation stabilizer, flame retardant, anti-drip agent, a fragrance, a fiber, or a combination comprising at least one of the foregoing.

15. The method of claim 1, further comprising combining the spherical polymer particles with a flow promoter in an amount of 0.001 to 1 weight percent, based on the weight of the spherical polymer particles.

* * * * *